United States Patent

Baron et al.

[11] Patent Number: 6,065,927
[45] Date of Patent: May 23, 2000

[54] SPIKE STICK AND LATH PLACER

[75] Inventors: Les Baron; Ronald Hougen; William R. Newnes; Kelly MacDonald, all of Salmon Arm, Canada

[73] Assignee: CAE Electronics Ltd., St. Laurent, Canada

[21] Appl. No.: 09/079,900

[22] Filed: May 15, 1998

[51] Int. Cl.⁷ .................................................. B65G 57/00
[52] U.S. Cl. .................................... 414/789.5; 414/792.9; 198/692
[58] Field of Search ................................ 414/789.5, 789.6, 414/792.9; 198/692, 693

[56] References Cited

U.S. PATENT DOCUMENTS

| | | |
|---|---|---|
| 3,169,646 | 2/1965 | Mason . |
| 3,643,621 | 2/1972 | Newnes . |
| 3,722,343 | 3/1973 | Cornell .................... 198/692 |
| 3,968,886 | 7/1976 | Leon . |
| 4,801,233 | 1/1989 | Ritola .................... 414/789.5 |
| 4,878,803 | 11/1989 | Whiddon .................... 414/789.5 |
| 5,244,341 | 9/1993 | Dion et al. . |
| 5,544,737 | 8/1996 | Connor .................... 198/692 |
| 5,636,965 | 6/1997 | Newnes et al. .................... 414/789.5 |
| 5,863,176 | 1/1999 | Newnes et al. .................... 414/789.5 |
| 5,873,510 | 2/1999 | Hirai et al. .................... 227/130 |

Primary Examiner—Gregory A. Morse
Attorney, Agent, or Firm—Antony C. Edwards

[57] ABSTRACT

A device for placing spacing sticks or lath onto an upper surface of a lumber stack includes a stick holder for holding, in gravity fed abutment, a singulated array of parallel, adjacent, elongate spacing sticks or lath, a stick presenter for receiving a lower-most spacing stick or lath, gravity fed from the array of spacing sticks or lath held in the holder, and for presenting the lower-most spacing stick or lath into alignment beneath a selectively actuable stick spiker, wherein the stick spiker includes at least one spike having a longitudinal driving axis, a driver for selectively driving the spike along the longitudinal driving axis between a retracted position and all extended position so as to penetrate, when in the extended position, the spike into releasable engagement with the spacing stick or lath when in the alignment, the spacing stick or lath positioned in the alignment when positioned adjacent and beneath the at least one spike when in the retracted position so as to intersect the longitudinal driving axis with the spacing stick or lath, a stick lowerer for lowering the stick spiker, and for lowering the spacing stick or lath when releasably engaged with the stick spiking means, into proximity with the upper surface of the lumber stack, a stick stripper for stripping the spacing stick or lath from the stick spiker when the spike is retracted from the extended position into the retracted position so as to register the spacing stick or lath with the upper surface of the lumber stack.

20 Claims, 14 Drawing Sheets

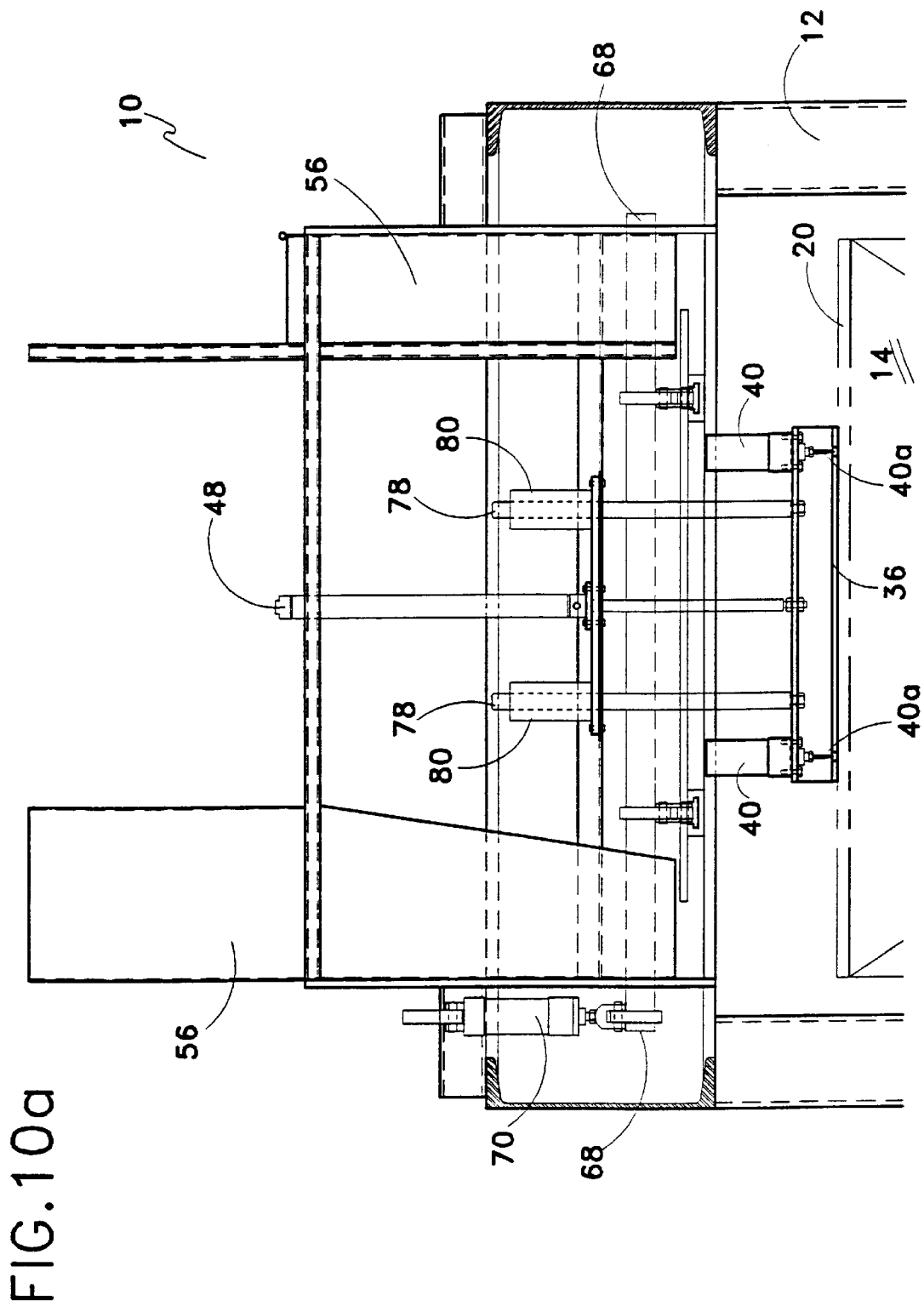

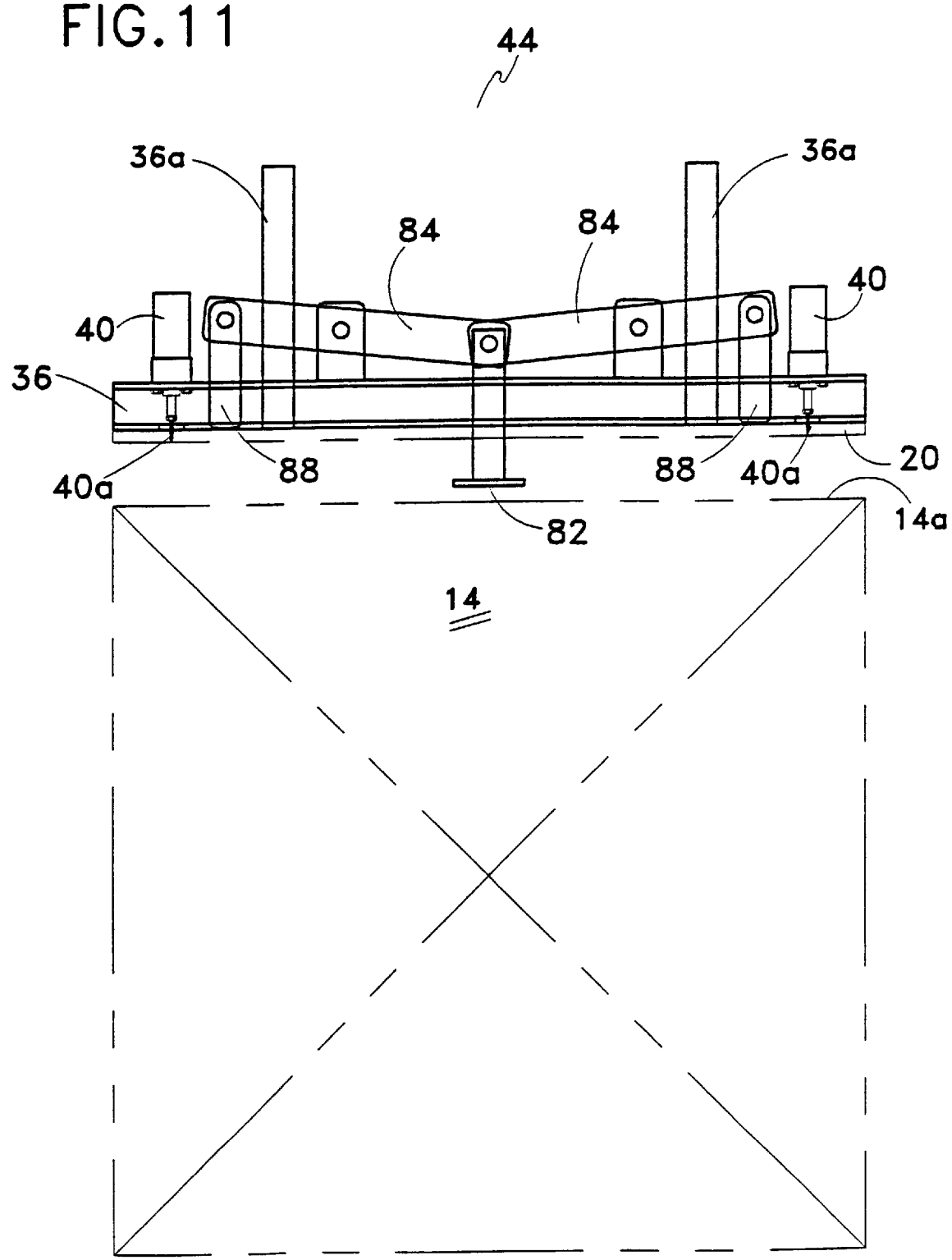

SPIKE STICK AND LATH PLACER

FIELD OF THE INVENTION

This invention relates to an apparatus for placing spacing sticks and/or lath onto stacks of lumber adjacent to a stacker in a sawmill. In particular, this invention relates to an apparatus capable of automatically placing spacing sticks from a conveyor, or placing either spacing sticks or packaging lath from hoppers, onto tiers of lumber, perpendicular to the lumber, as the lumber is placed by the stacker.

BACKGROUND OF THE INVENTION

Previously most spacing stick or lath placer machines, hereinafter collectively alternatively referred to as stick placers, incorporated a stick carrier such as a finger-like device, a shelf, or a vacuum lifting device. One example of a stick placer used for spacing lumber for drying purposes, which is the subject of U.S. Pat. No. 3,643,621, utilizes a plurality of single magazines having a placing device below each magazine. The device does not lend itself to automatic feed, and does not work effectively with thin lath used for transporting finished lumber packages. It may not easily be combined to place both spacing sticks and lath.

An example of a lath placer is the subject of U.S. Pat. No. 5,244,341. This device utilizes a rotary vacuum actuator that picks lath up from the top of a short curved magazine. The actuator rotates back from the magazine and drops the lath onto the lumber package. The device can not effectively deliver spacing sticks used for spacing lumber for drying and likely could not be used in a combined system for both lath and spacing sticks.

U.S. Pat. No. 3,968,886 teaches a device that likely could not be combined to successfully place both spacing sticks or lath using the same apparatus. The apparatus of U.S. Pat. No. 3,169,646 is designed for spacing sticks and could only capably handle either spacing sticks or, possibly, lath at any one time. No means is provided for positive placement of spacing sticks or lath.

One disadvantage of prior art machines addressed in the present invention is that given that the top surface of a lumber stack is rarely completely level or even because each piece of lumber is not exactly the same shape as the piece beside it, especially where lumber is often curve-sawn, a spacing stick or lath dropped onto that surface may bounce and consequently be misplaced. Thus it is an object of the present invention to accurately place sticks and lath, especially at the ends of the lumber stacks, where typically sawmills require a flush end face of the stack to reduce checking as the lumber stack is dried.

It is a further object of the present invention to produce an apparatus wherein delivery of sticks is automatic, maybe faster than with present installations so as to equal to the speed capabilities of known lumber stackers. Many methods of feeding sticks or lath may be employed for such delivery.

It is another object of the invention to produce an apparatus wherein the system can deliver spacing sticks and packaging lath, using the same apparatus to deliver sticks or lath to various predetermined position, with improved consistency and accuracy, with reduced probability of hang-ups or miss delivered spacing sticks.

It is still another object of the invention to provide a device that can be retro-fitted to existing lumber stackers without extensive changes.

It is further an object of the invention to allow for adjustability for a second lumber line at a first stick placing position, which eliminates the conventional use of one-foot stick placement spacing on a lumber package to allow for odd lengthed lumber packages.

SUMMARY OF THE INVENTION

A support frame is positioned adjacent to and above a lumber stacker. Hoist knees on lumber stacker are raised to start a new lumber stack and then lowered as each additional tier is added to the lumber stack.

The support frame supports an automatic stick delivery system for delivering spacing sticks or lath to spiked cylinders. Spike cylinders are selectively actuable, generally vertical hydraulic or pneumatic cylinders or the like which when actuated, drive an elongate spike mounted to a lower end thereof, along a longitudinal axis co-linear with the longitudinal axis of the cylinder. The automatic stick delivery system consists, first, of a known type of allocation system for programmed delivery of the sticks to an overhead lugged transfer, which in turn delivers the sticks to the top of a plurality of angled ramps or pockets. The sticks are moved along on a skid system by circulating lugs attached to the overhead lugged transfer. The sticks either drop down the angled ramp or pass over a plurality of diverter gates on the skid system. When the appropriate diverter is actuated, a stick will drop down the angled ramp. The angled ramp serves as a hopper which stores the sticks before being placed onto the lumber stack.

As the sticks slide down the angled ramp they come up against a fixed stop which holds the sticks just below the spike cylinders. A pivoting shelf is provided to bold the lower-most stick in place. The spike cylinders are lowered to bring the spikes into proximity to the lower-most stick, and the cylinder actuated so as to drive the spikes to pierce the stick held on the pivoting shelf. Once the stick is pierced, continued lowering of the spike cylinder pivots the pivoting shelf due to the downward pressure extended by the spike cylinder. The shelf is pivoted downwardly so as to allow the downward movement of the stick, spike cylinder and a cylinder mount. The cylinder mount holds the spike cylinder and spike relative to the pierced stick. The spike cylinder mount includes a flange on the side of the mount closest to the angled ramp. The flange prevents other sticks held on the ramp from sliding downwardly along the ramp until the next stick is required for placing on top of the stack of lumber. Once the spike cylinder and cylinder mount are raised to return to a retracted upper-most position, the pivoting shelf pivots upwardly, urged by a torsion spring or other resilient biasing means so as to return to its horizontal stick supporting position. The next stick is then allowed to advance under the spike cylinder mount, urged by the weight of the sticks held on the ramp, so as to abut the fixed stop and to await the next stick placing cycle.

The automatic feed system is configured to allow the angled ramp and diverter to be adjustable to suit a particular sawmill lumber length application. The automatic feed system uses a stick placement means, which may be a parallelogram type or similar device, to allow the spike cylinder mount to be mounted to the support frame from one side. This configuration is used to minimize the space required for the spike placer mounting and actuator and also allows the stick to be placed with one end of the stick contacting one side of the package first. This facilitates the stick being stripped from the spikes so as to place the stick on the lumber stack once the opposite end of the stick falls to finish placement of the stick. This method inhibits bouncing of the stick. Bouncing may cause the stick to lay on its edge. This is often a problem when the top tier is lower than anticipated. In conventional equipment the stick is often dropped onto the package instead of placing of the stick as is desired, when the top tier is lower than anticipated.

In an alternative embodiment a first stick placement means, which is located at on end of the array of stick placers, allows the lumber line of the lumber stack to be varied. In this embodiment a spike placer and mount rotates or swings from a stick pick-up position to a stick placing position by means of a rotatably mounted actuable cylinder, rotatably mounted to the support frame. This allows the stick to be placed a short lateral distance away from the first stick ramp in an array of stick ramps supported by the support frame. This provides clearance for the placement of tiers of lumber onto the lumber stack while accommodating an adjustable lumber line which is required in some sawmill situations.

In a second alternative embodiment, a plurality of spaced apart magazines are mounted on top of the support frame. Each magazine contains one or two hoppers, depending on whether it is intended that just spacing sticks, or that spacing sticks or lath be delivered. Means for positioning the spacing sticks or lath includes a shear, which may be a horizontal shear situated below the spacing stick or lath magazine hoppers. Each shear is actuated by a linkage, driven by an air cylinder or other selectively actuable means. The shear is positioned at the bottom-most of each magazine hopper. When actuated it pushes the bottom spacing stick or lath out from under the stack of spacing sticks or lath in the magazine hopper, and positions the spacing stick or lath directly under the spike cylinder, for stabbing or piercing by the spike for subsequent placement of the stick onto the lumber stack.

The spike cylinders are mounted onto a cylinder mount. The cylinder mount is mounted to a vertical guide member. The vertical guide member assists guiding the spike cylinder mount as it is lowered. In one embodiment, the spike cylinder mount supports at least one, often two or more spike cylinders and accommodates a placement cylinder or other means for lowering and raising the spike cylinder mount. When actuated, the placement cylinder strokes down, transporting the spacing sticks, or lath being held by the spike cylinders onto the lumber stack, so as to positively place the spacing stick or lath on top of the lumber stack. To strip the sticks from the spikes on the spike cylinders, the spikes are retracted so that the stick or lath is pulled up against the bottom of the spike cylinder mount. The sticks are thus left in the desired placement. The placement cylinder is then retracted to return the cylinder mount to its upper-most position, ready to begin the next cycle.

The magazines are located along the support frame so as to be positioned in spaced array along, and over, a lumber stack. The magazines may be individually actuated, or a group or plurality of magazines may be actuated so as to place only the desired number of sticks or lath depending on the length of lumber being stacked, or so as to place sticks in only desired locations. Means may be provided for making the magazines adjustable for different lumber lengths or variations in lumber lengths.

The stick placer of the present invention places a group of spacing sticks in their appropriate spaced apart locations along each tier on the lumber stack. The end spacing sticks are placed flush with the ends of the lumber stack. If a finished product is being stacked, then a group of lath is placed on top of, and spaced along the length of, approximately every 6th tier, perpendicular to the lumber stack, as may be required to build a stable lumber stack for transportation.

In some situations it is difficult to maintain the anticipated height of the top of the lumber stack. Thus a spike may strike the top of the lumber stack if the lumber stack is higher than it should be, or a stick may be dropped if the top of stack is lower than it should be. In those situations, an alternative means for stripping the sticks from the spikes may be provided by means of a mechanical linkage. When the cylinder mount is lowered to the top of the lumber stack a foot contacts the top of the lumber stack. The foot activates a lever arm. The lever arm causes the stick to be stripped from the spikes and accurately places the stick. The foot takes up any variation in the height of the lumber stack. The mechanical linkage compensates so as to strip and properly place the sticks onto the lumber stack.

In summary, the device for placing spacing sticks or lath onto an upper surface of a lumber stack of the present invention includes:

(a) stick holding means for holding sticks or lath delivered from any feeding or transfer apparatus, and in one embodiment for holding, in gravity fed abutment, a singulated array of parallel, adjacent, elongate spacing sticks or lath, (b) stick presentation means for receiving a stick or lath from the stick holding means for example a lower-most spacing stick or lath, gravity fed from the array of spacing sticks or lath held in the holding means, and for presenting the spacing stick or lath into alignment beneath a selectively actuable stick spiking means, wherein the stick spiking means includes at least one spike having a longitudinal driving axis, driving means for selectively driving the spike along the longitudinal driving axis between a retracted position and an extended position so as to penetrate, when in the extended position, the spike into releasable engagement with the spacing stick or lath when in such alignment, the spacing stick or lath positioned in such alignment when positioned adjacent and beneath the at least one spike when in the retracted position so as to intersect the longitudinal driving axis with the spacing stick or lath, (e) stick lowering means for lowering the stick spiking means, and for lowering the spacing stick or lath when releasably engaged with the stick spiking means, into proximity with the upper surface of the lumber stack, and (d) stick stripping means for stripping the spacing stick or lath from the stick spiking means when the spike is retracted from the extended position into the retracted position so as to register the spacing stick or lath with the upper surface of the lumber stack.

In one embodiment the spike is resiliently mounted to the driving means by a resilient mount, which may be a resilient collar mounted to the driving means, where the base of the spike is snugly journalled in the collar.

The stick holding means may be a stick or lath pocket and the stick presentation means may be a rigid platform mounted at an open lower-most end of the pocket. The platform may be selectively positionable, by positioning means, between a stick supporting position adjacent and beneath the spike when in the retracted position, and a non-supporting position removed from beneath the spike and removed from a travel path of the spike as the spike is driven from the retracted to the extended position. A stick or lath is supported on the platform when fed from the open lower-most end of the pocket.

In one embodiment, the platform is a pivotable shelf, and the positioning means is a resiliently biased hinge means for pivoting of the shelf from the stick supporting position to the non-supporting position against a return biasing force of the resiliently biased hinge means, where the stick supporting position is a horizontal position and the non-supporting position is rotationally deflected about the hinge means so as to be lowered from the horizontal position out of the travel path of the spike. The shelf is deflected from the horizontal position by lowering of the spike and the stick spiking means by the stick lowering means.

In a further embodiment, the platform is a selectively translatable shear and the positioning means is a shear translating means for selectively retractably translating the shear from beneath the open lower-most end of the pocket into the travel path of the spike so as to align the stick or lath with the longitudinal driving axis. The shear is retracted once the spike has been driven so as to releasably penetrate the stick or lath.

The stick lowering means may be a parallelogram linkage of rigid members. The parallelogram linkage of rigid members may be pivotally mounted to a support frame, and selectively pivotable by selective actuation means so as to be selectively pivotable between an elevated position and a lowered position. In the lowered position the stick spiking means, mounted to the parallelogram linkage, is in proximity to the upper surface of the lumber stack. Advantageously, the parallelogram linkage in the lowered position lowers a first end of the stick or lath on the stick spiking means into proximity to the upper surface of the lumber package sequentially first before lowering a second opposite end of the stick or lath.

In one aspect of the present invention, a device for spiking a lumber workpiece includes at least one spike having a longitudinal driving axis, and driving means for selectively driving the spike along the longitudinal driving axis between a retracted position and an extended position so that, when in the extended position, the spike releasably penetrates a lumber workpiece oriented generally perpendicularly to the longitudinal driving axis so that the driving axis intersects the workpiece.

The invention provides other advantages which will be made clear in the description of the preferred embodiments.

BRIEF DESCRIPTION OF THE DRAWINGS

The invention will be better understood by reference to the accompanying drawings, wherein:

FIG. 11 is an end elevation view showing an alternative stick stripping mechanism in an elevated position above a lumber stack;

DETAILED DESCRIPTION OF THE PREFERRED EMBODIMENT

Figure 1:
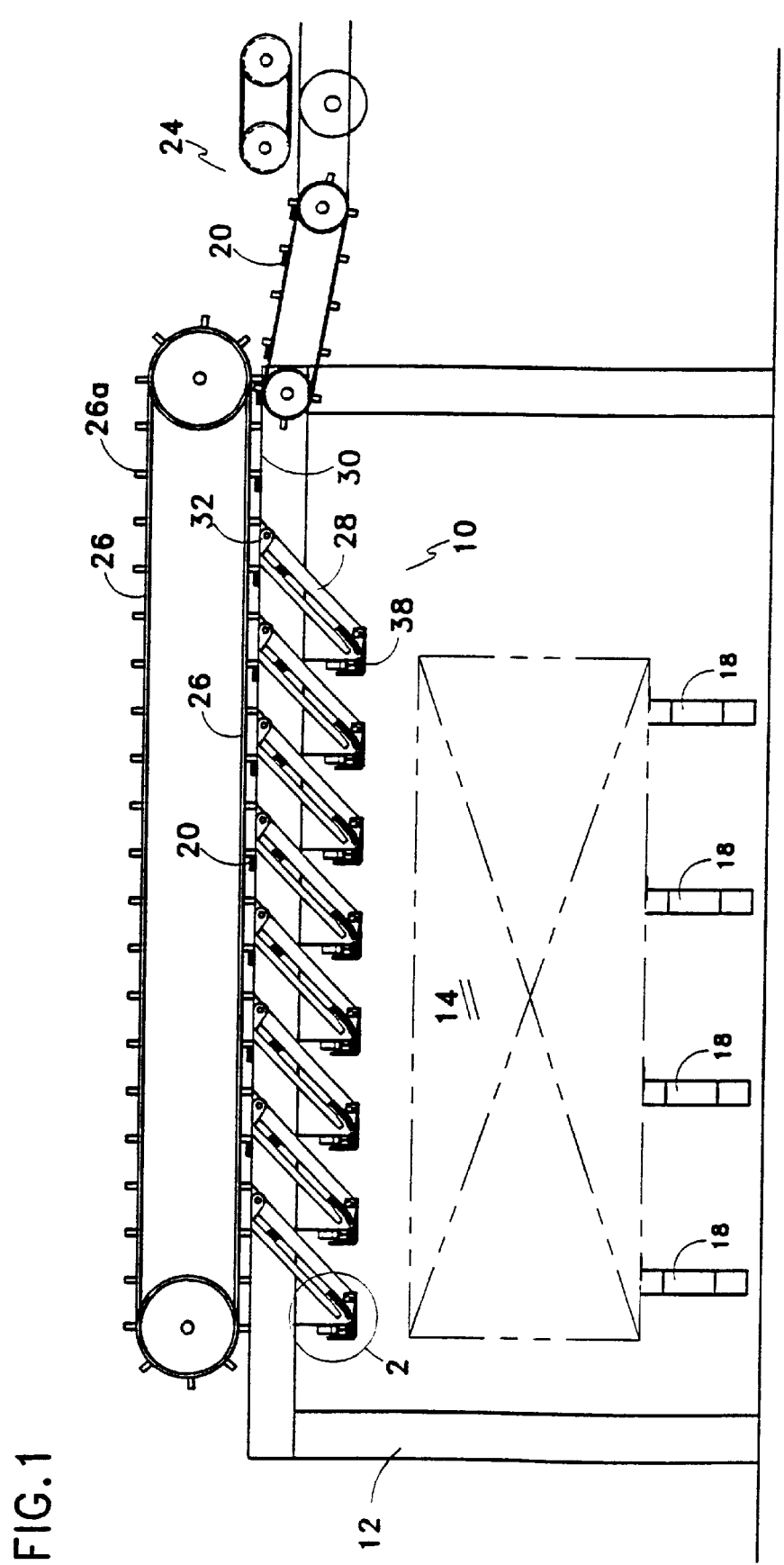
FIG. 1 is a side elevation view according to a preferred embodiment of the invention.
Figure 2:
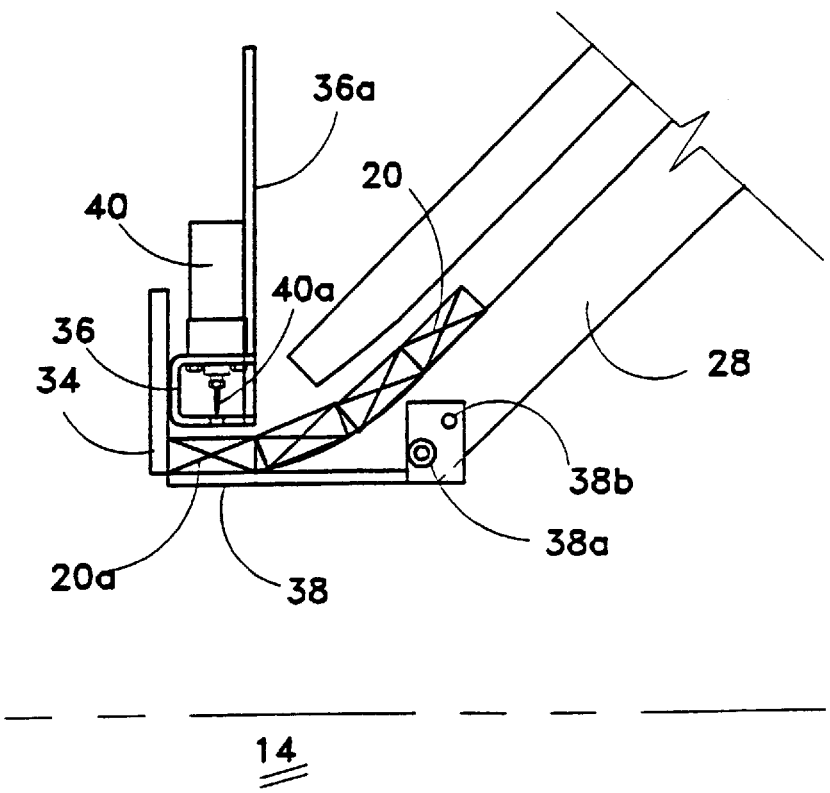
FIG. 2 is an enlarged view of the stick placer of the preferred embodiment of FIG. 1.

Referring to the drawing FIGS. 1–12 wherein similar characters of reference represent corresponding parts in each of several views, the apparatus of the present invention is generally indicated by the reference numeral 10. Apparatus 10 includes a square tubular steel support frame, constructed of various vertical and horizontal structural supports 12, for mounting next to a lumber stacker (not shown). The lumber stacker delivers lumber in tiers or layers so as to form a lumber stack 14 on hoist knees 18. Spacing sticks 20 or, interchangeably, lath 22 are placed onto the top surface of lumber stack 14 as the stack is formed so as to leave sticks 20 or lath 22 positioned between the tiers of lumber.

In a preferred embodiment, an automatic stick delivery system consists, first, of a known type of allocation system 24 for delivery of sticks 20 to a lugged transfer 26 mounted above apparatus 10. Lugged transfer 26 delivers sticks 20 to angled ramps 28. Sticks 20 are moved along by circulating lugs 26a on the lugged transfer 26. Sticks 20 are moved along on a plurality of skids 30. Diverter gates 32 are mounted flush with skids 30. Gates 32 when actuated pivot downwardly to divert sticks 20 down the appropriate or desired angled ramp 28. Angled ramp 28 serves as a hopper to store sticks 20 ready to be placed onto the lumber stack.

Figure 4:
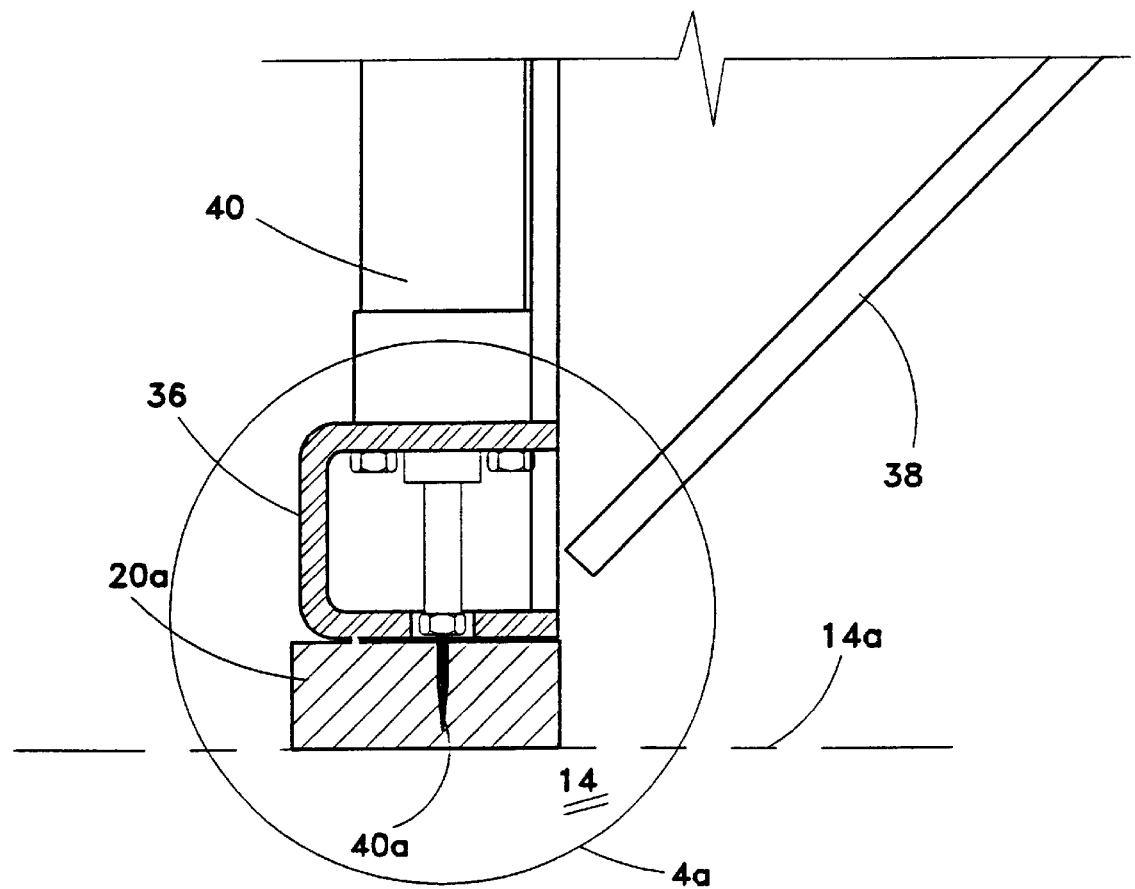
FIG. 4 is an enlarged view of the embodiment of FIG. 3, better showing a spike penetrating a spacing stick.
Figure 4A:
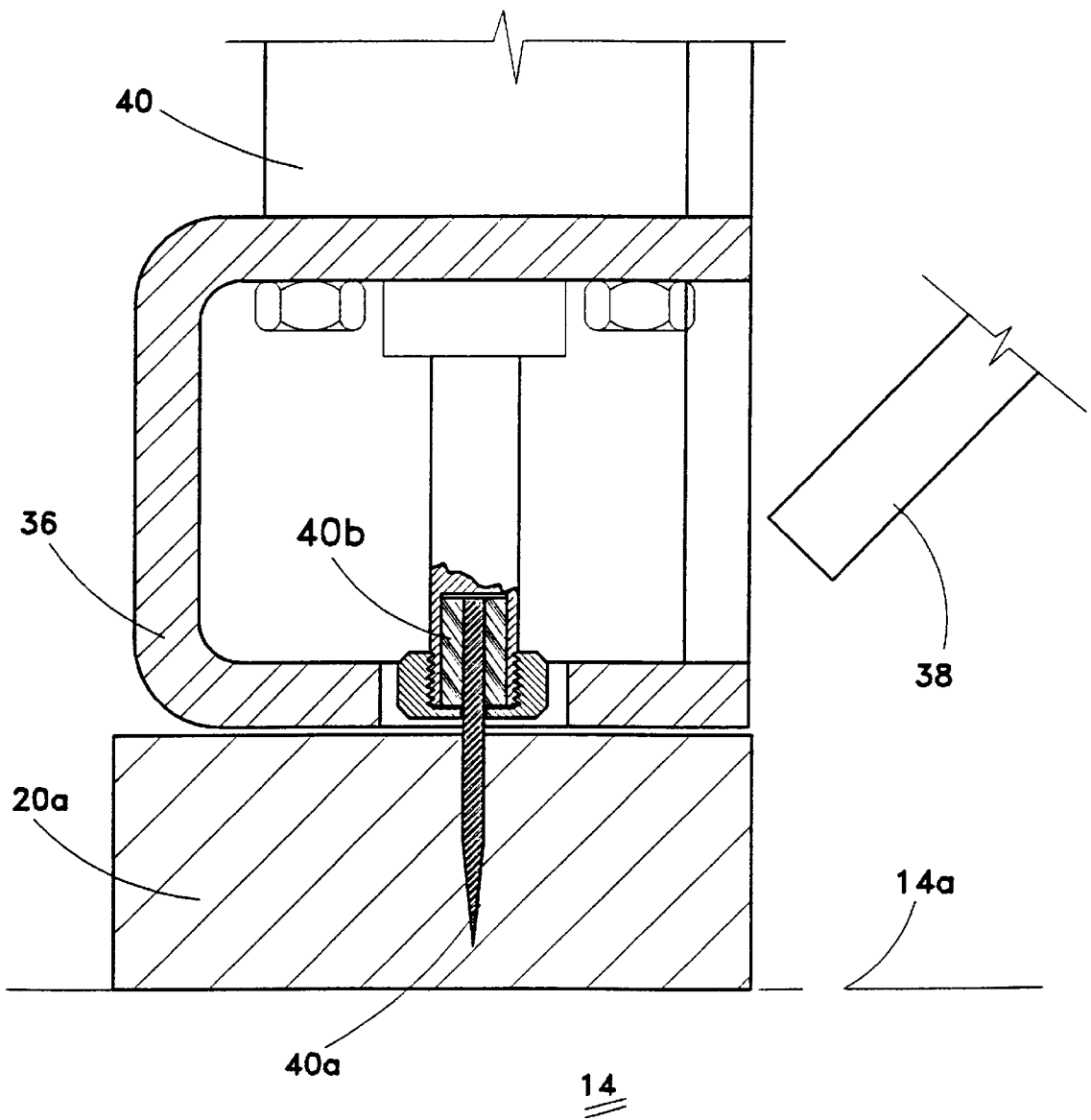

Sticks 20 slide down ramp 28. Ramp 28 may be a conventional stick pocket. The lower-most stick 20a on ramp 28 is stopped against a fixed stop 34 so as to position the stick just below spike cylinder mount 36. Pivoting shelf 38 holds the lower-most stick 20a in place underneath spike cylinder mount 36 adjacent fixed stop 34. Each spike cylinder 40 is actuated to drive a corresponding spike 40a downwardly so as to pierce lower-most stick 20a. As seen in FIG. 4a, spike 40a may be mounted by means of a resilient collar 40b or other means to secure spike 40a vertically by its base. Spike 40a extends downwardly from spike cylinder mount 36 to a tapered pointed lower-most end.

Figure 3:
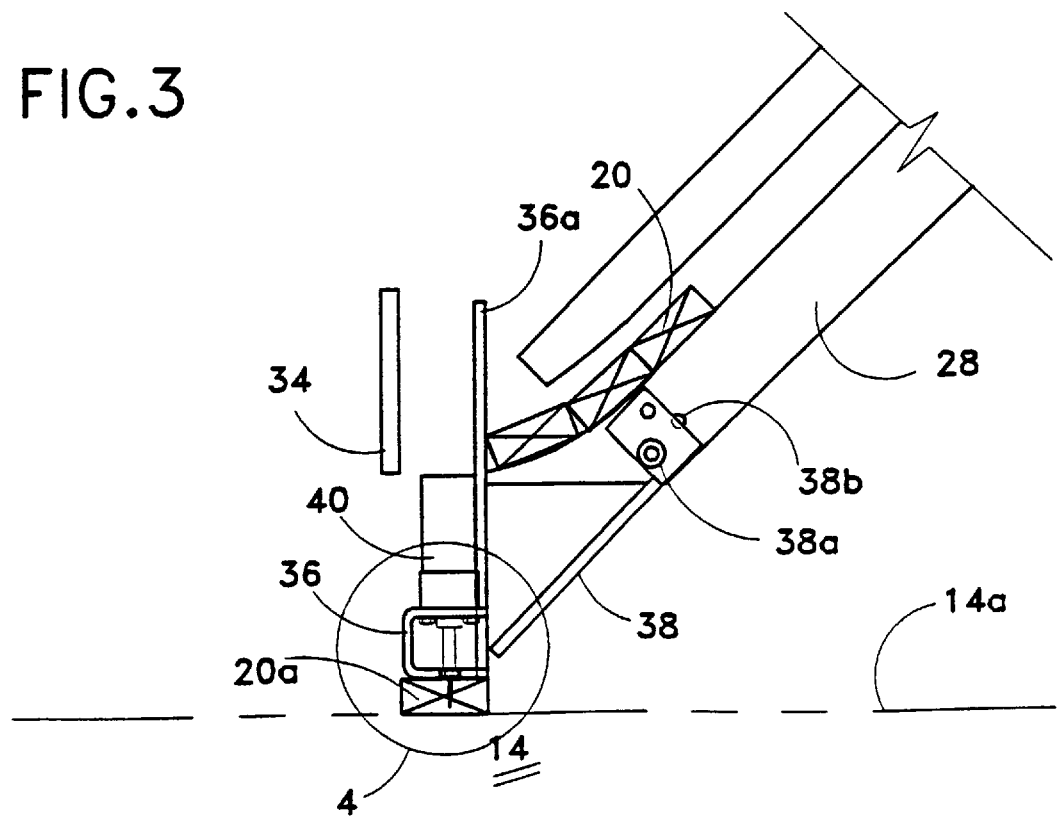
FIG. 3 is the enlarged view of FIG. 2 showing the stick placer in its lower-most position prior to releasing a spacing stick onto a lumber package.
Figure 5:
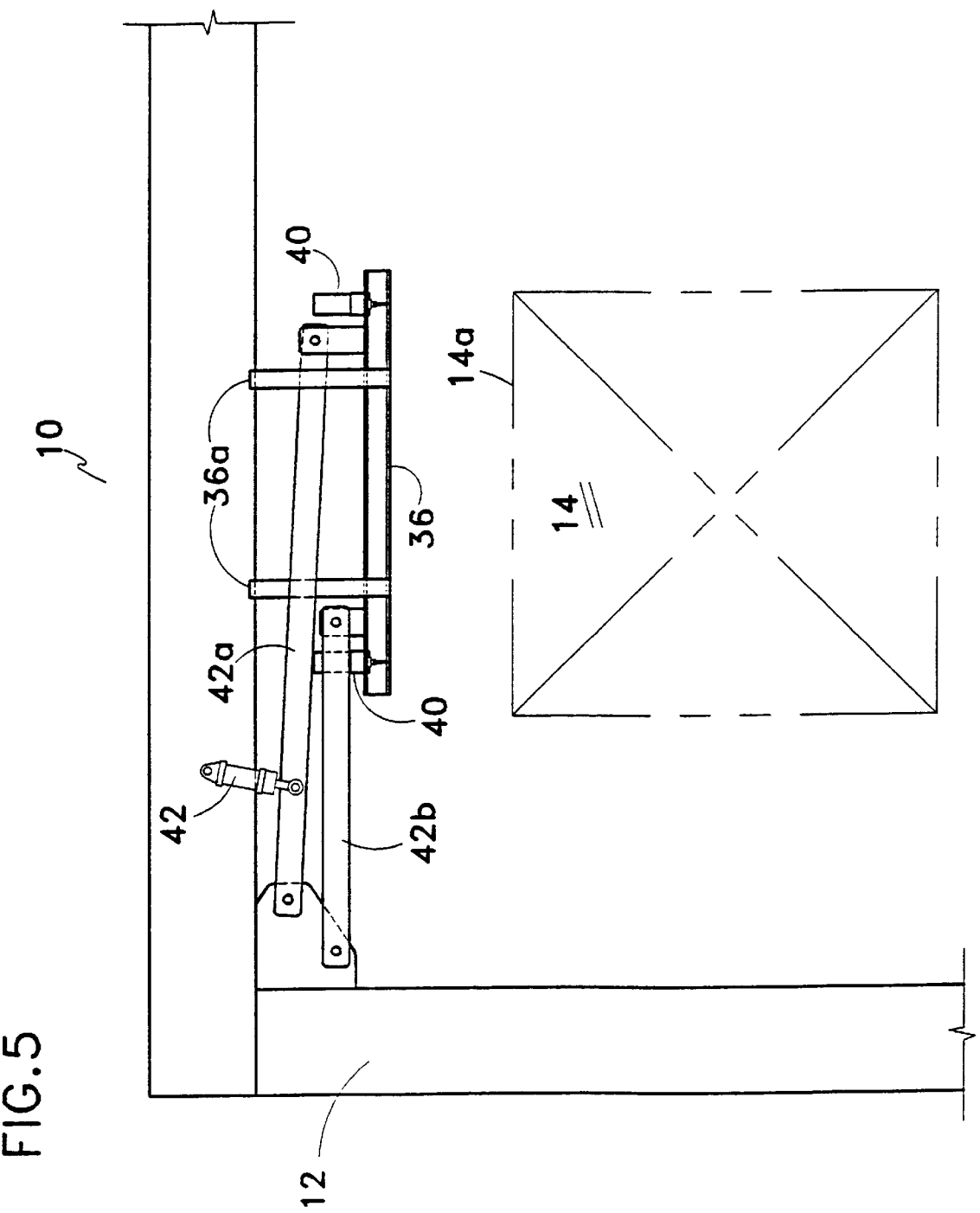
FIG. 5 is an end elevation view of the preferred embodiment, with the spike cylinder and the spike cylinder mount in its upper-most position.

Once stick 20 supported on pivoting shelf 38 has been pierced, extension cylinder 42, seen in FIG. 5, extends down, lowering spike cylinder mount 36. Pivoting shelf 38 is pushed down so as to pivot out of the downward translation path by the stick being lowered by extension cylinder 42. Pivoting shelf 38 is resiliently held in the horizontal stick receiving position by means of a detent a 38b and a torsion spring (not shown) mounted on pivot 38b, or by means of other resilient biasing means. Rigid vertical members 36a are mounted to spike cylinder mount 36 so as to prevent sticks 20 on ramp 28 from sliding downwardly as stick cylinder mount 36 is lowered when placing stick 20a on top of lumber stack 14, as seen in FIG. 3. Once spike cylinder mount 36 is elevated so as to return to the upper-most position seen in FIG. 2, the next adjacent stick 20 on ramp 28 is free to advance, sliding under spike cylinder mount 36 so as to come against fixed stop 34 to await the next stick placement cycle.

In a further embodiment, the pivoting shelf 38 may instead be selectively retractable.

Figure 6:
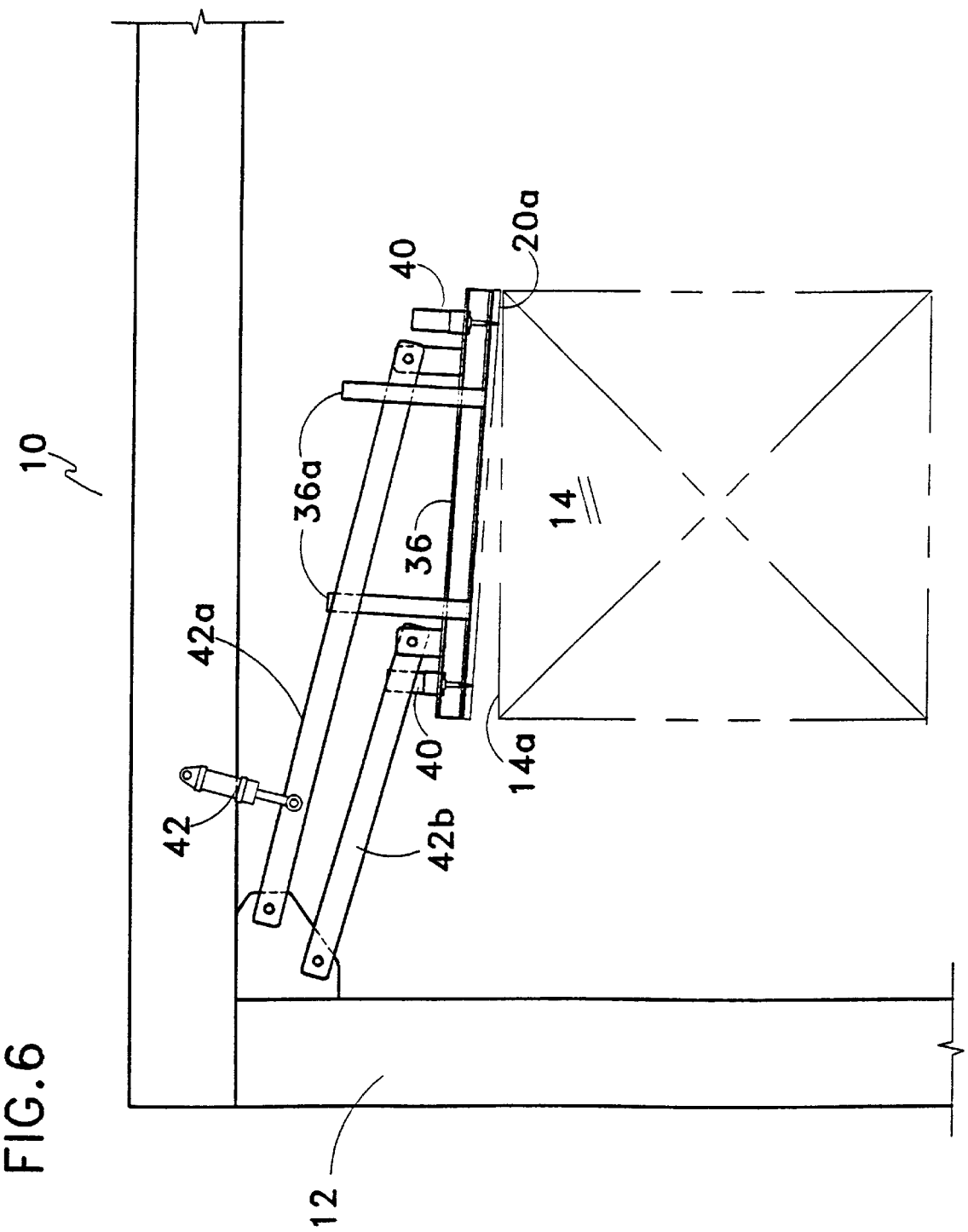
FIG. 6 is an end elevation view of the preferred embodiment of FIG. 5, with the spike cylinder and the spike cylinder mount in a lowered position showing a spacing stick being placed onto a lumber package.

As seen in FIGS. 5 and 6, in one embodiment the automatic feed system of the present invention uses a parallelogram-type linkage 42a and 42b stick placement device. This arrangement allows spike cylinder mount 36 to be held from one side as seen in corresponding FIGS. 5 and 6. FIGS. 5 and 6 illustrate spike cylinder mount 36 in its elevated and in its lowered position respectively. This configuration is used to minimize the space required for spike cylinder mount 36. The parallelogram-type linkage 42a and 42b is selectively raised or lowered by a cylinder 42 or other selective actuation means (not shown).

Figure 7:
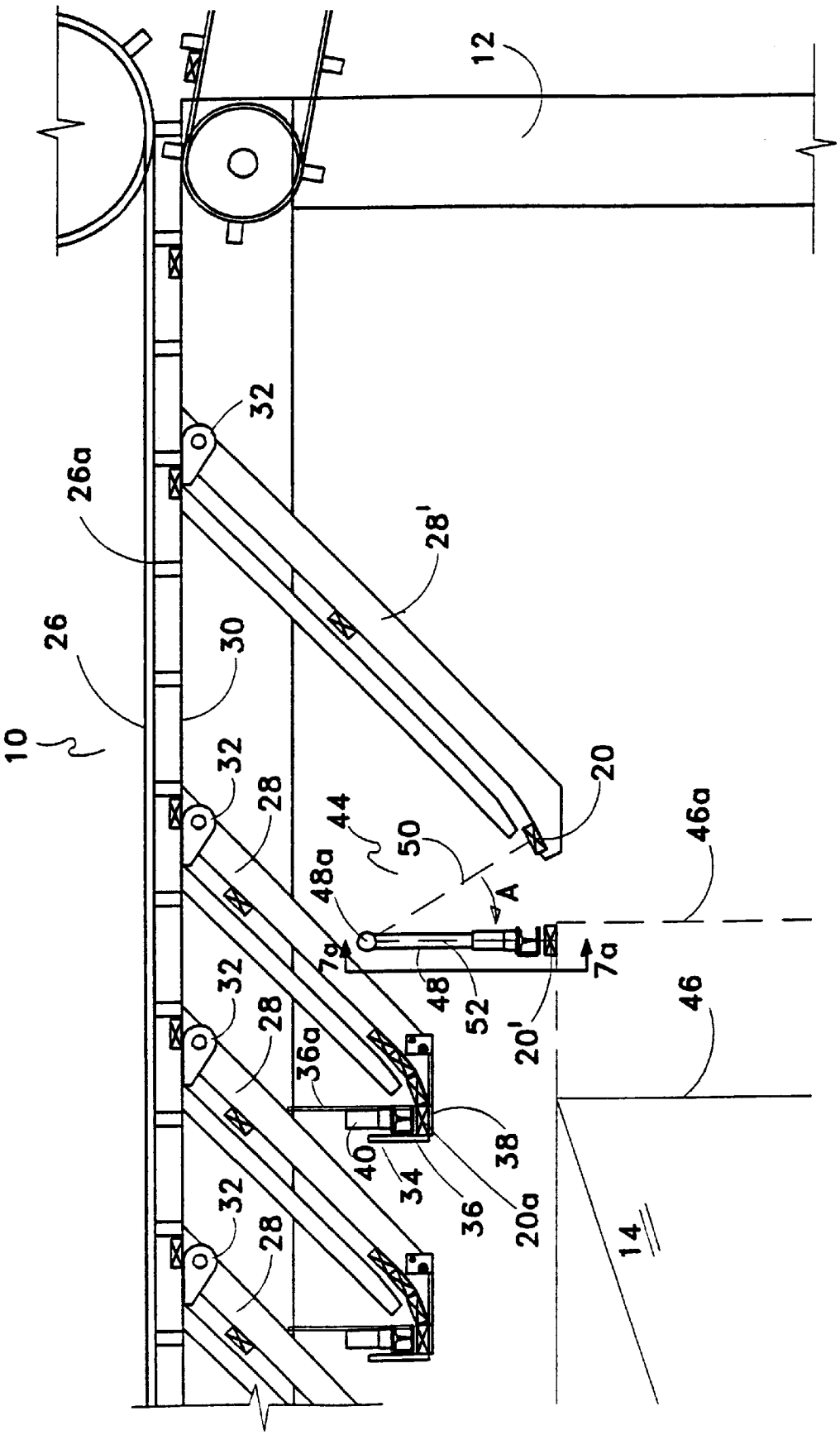
FIG. 7 is an enlarged fragmentary side elevation according to an alternative embodiment of the invention.
Figure 7A:
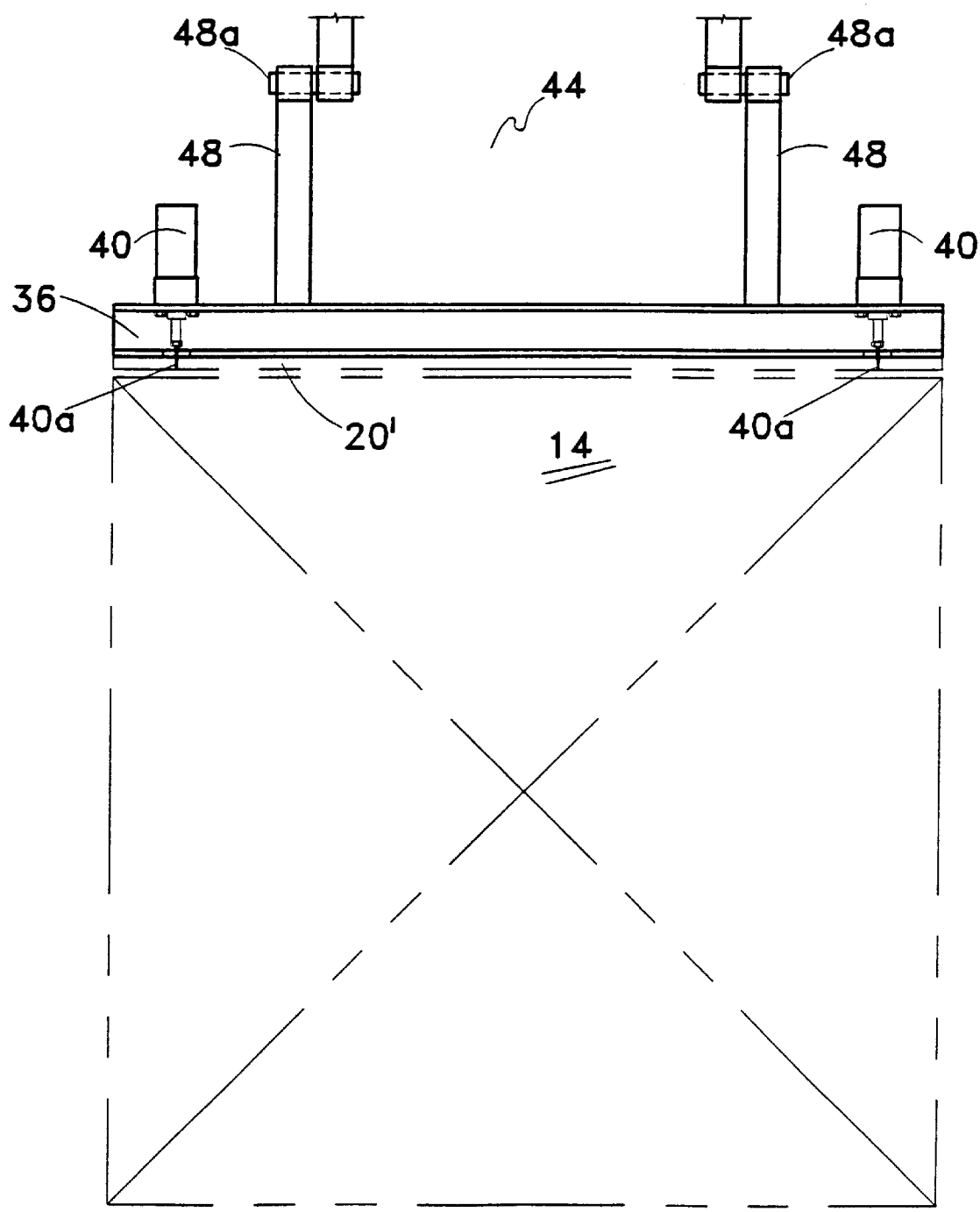

A further embodiment is illustrated in FIGS. 7 and 7a. Stick placer 44 is used for placing a spacing stick 20 on an end of the lumber stack corresponding with the lumber line. For example, the lumber line of lumber stack 14 may be at either of two positions, 46 or 46a. Stick placer 44 is used when the lumber line approximately corresponds to position 46a. In use stick placer 44 is swung in direction A from stick pickup position 50 shown as a broken line, in FIG. 7, to stick placing position 52 (also shown as a broken line). Stick placer 44 is suspended by means of it actuating cylinder 48 pivotally mounted at pivot 48a. Pivot 48a is supported by the frame (although not shown for clarity). This allows stick 20' to be placed within the required distance of the adjacent stick ramp 28', so as to provide clearance for the placement of the lumber tiers of lumber package 14 as might be required in some sawmill situations.

Figure 8:
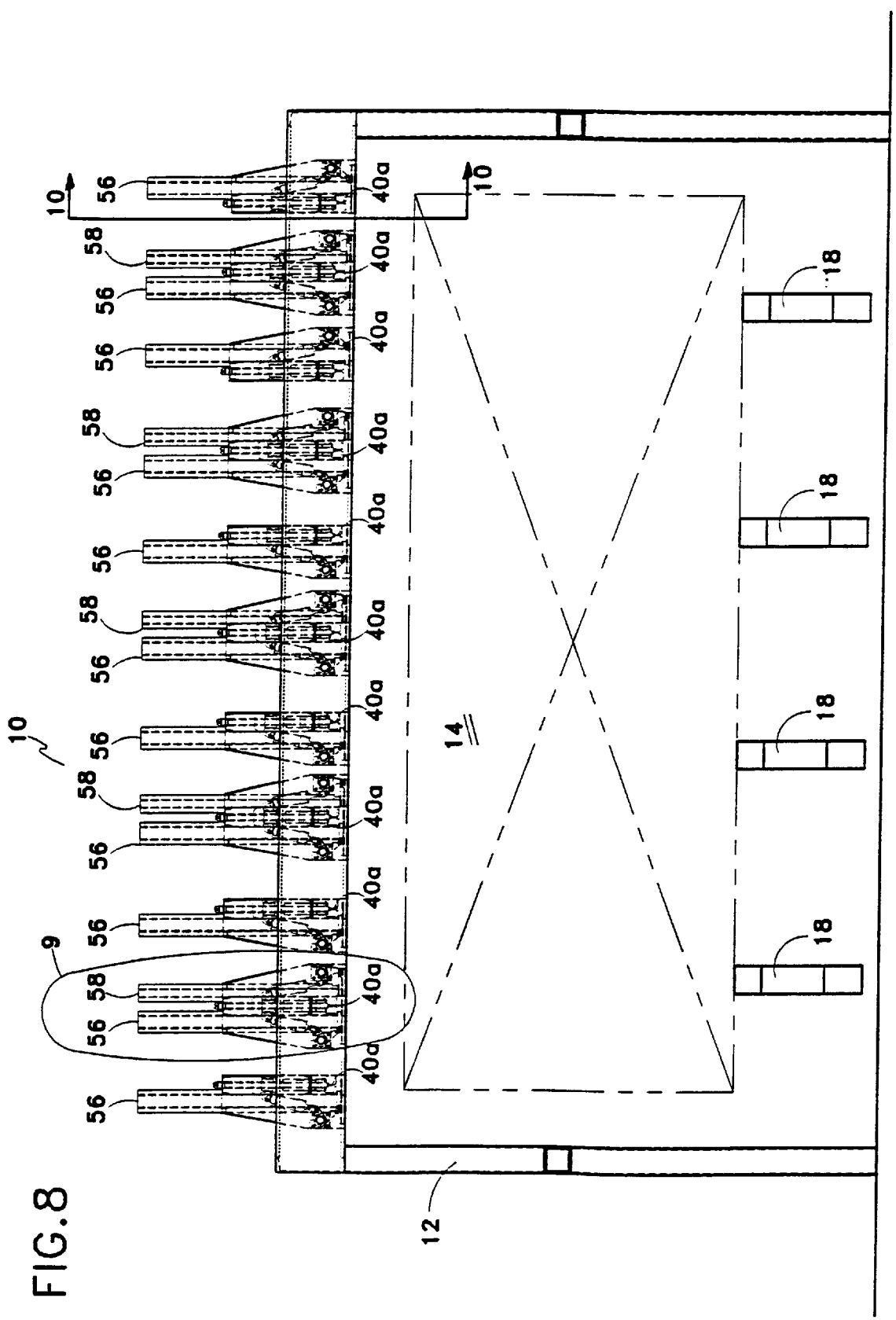
FIG. 8 is a side elevation view according to a further alternative embodiment of the invention.
Figure 9:
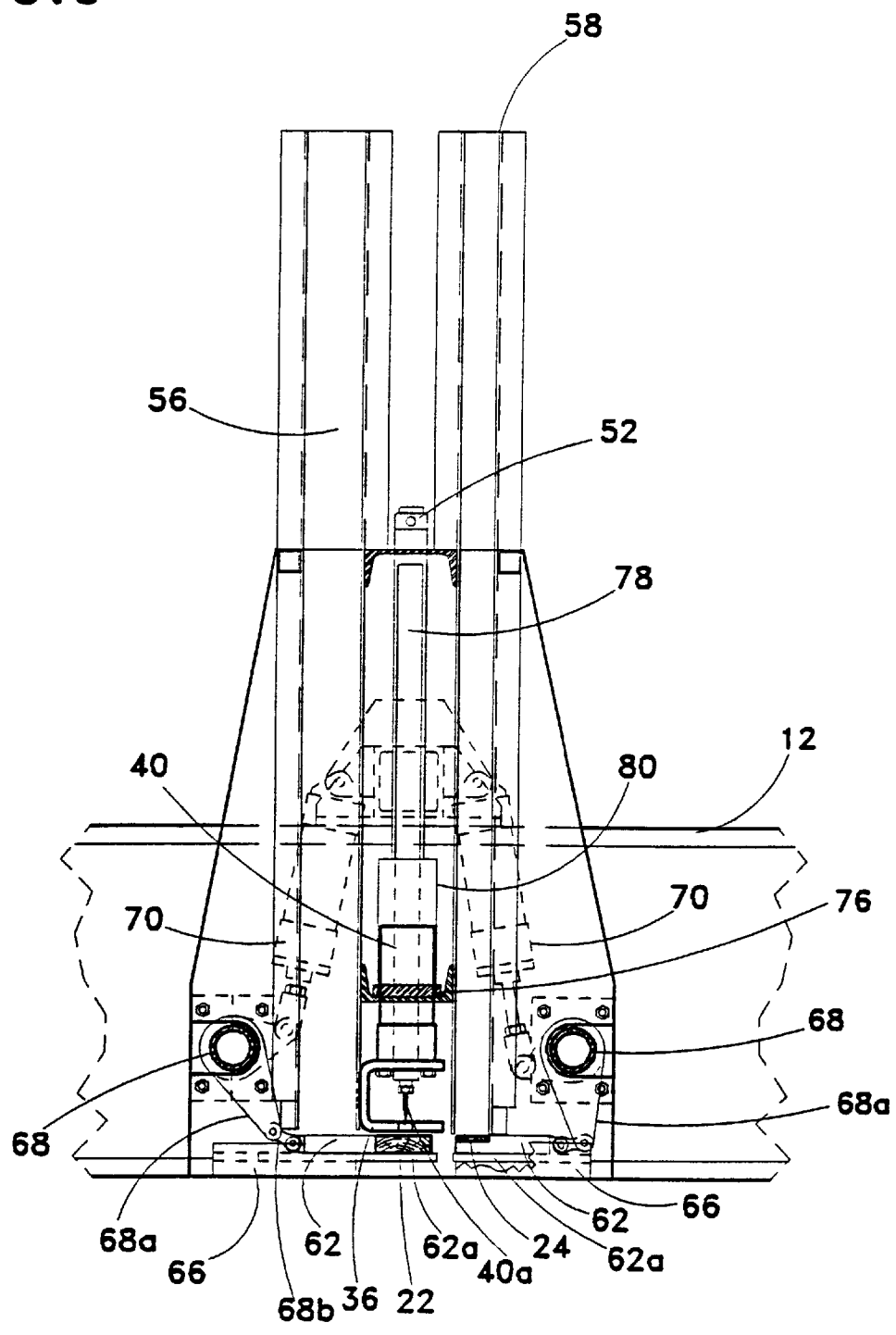
FIG. 9 is an enlarged, fragmentary side elevation view of the embodiment of FIG. 8.
Figure 10:
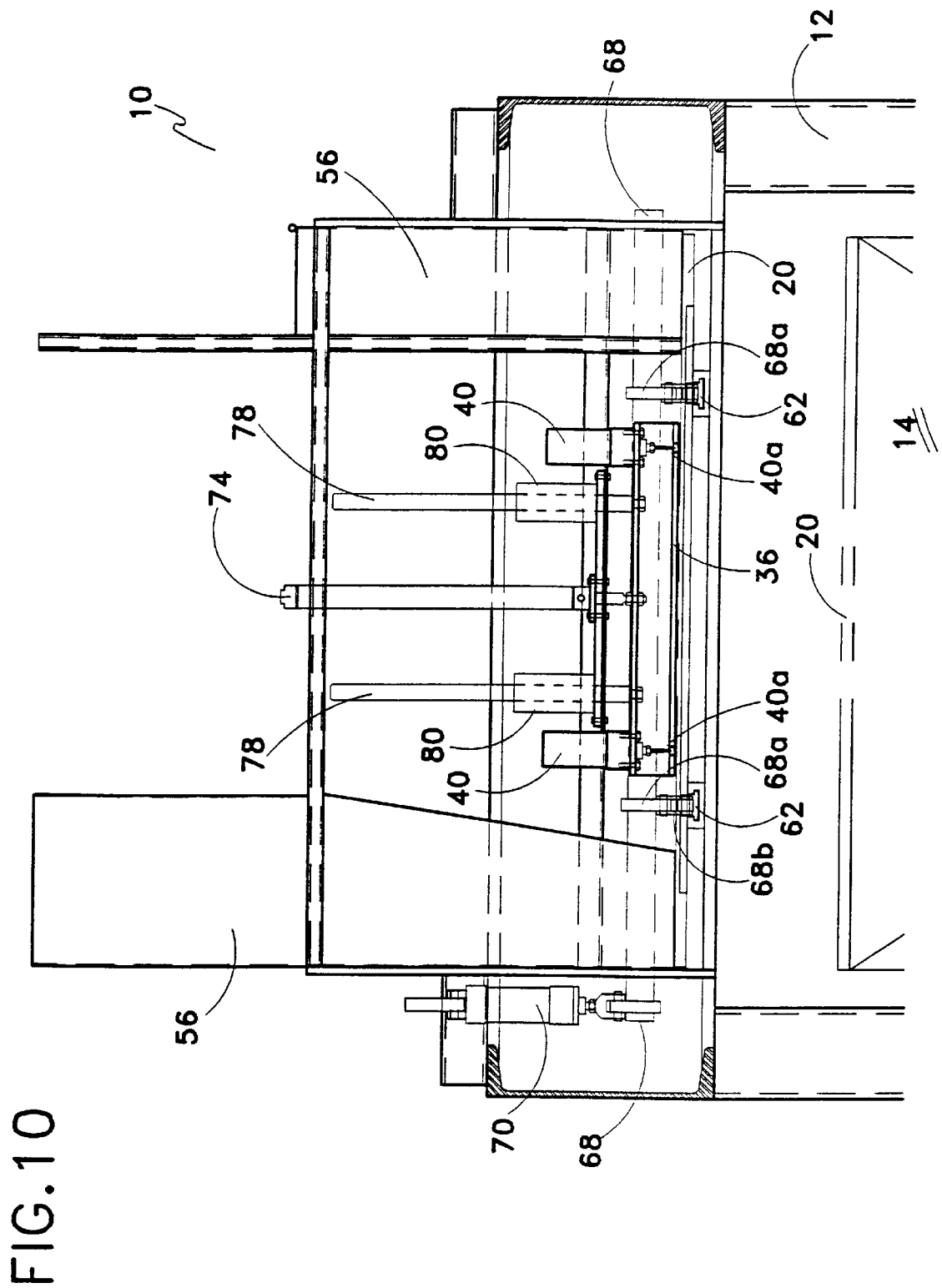
FIG. 10 is an enlarged, sectional end elevation view along line 10—10 in FIG. 8.

An alternative stick placing apparatus is seen in FIGS. 8, 9, and 10. Spacing stick magazines 56 and lath magazines 58 hold single stacks of spacing sticks 20 and lath 22 respectively. Spacing stick indexing shears 62 and lath indexing shears 64 are mounted under the open bottom ends of magazines 56 and 58 respectively. The shears may be selectively actuated to translate by sliding across the open bottom ends of magazines 56 and 58. Plates 62a and 64a are formed as part of shears 62 and 64 respectively. Plates 62a and 64a protrude from beneath the shears to provide shelves on which the sticks or lath rest when the shears are retracted and the plates positioned beneath the magazines. Translating the shears pushes a spacing stick 20 or lath 22 into a placement position below spike cylinder mounts 36. The edges of plates 62a and 64a slide in horizontal slots in guides 66. The indexing shears also act as stops below the open bottom ends of magazines 56 and 58 to prevent sticks or lath in the magazines from falling into place behind the shear before the shear is retracted. Indexing shears 62 and 64 are actuated by rotation of linkage rods 68 driving arms 68a and linkages 68b. Linkage rods 68 are selectively rotated by selective actuation of cylinders 70 seen in dotted outline in FIG. 9.

Actuating cylinder 70 rotates rod 68 which actuates indexing shears 62 and 64 causing lower-most spacing stick 20 or lower-most lath 22 to slide out from under the open bottom end of their respective magazines 56 or 58 into the placement position vertically aligned below spike cylinder mount 36. Spike cylinder mount is mounted to, so as to depend from, bracket 76. Uptight piston 78 is slidably jounalled in bushing or collar 80, to guide spike cylinder mounts 36, whereby spike cylinder mount 36 is free to translate vertically, but restrained from lateral movement.

Spike cylinder mount 36 is lowered by cylinder 74 into contact with the upper surface of spacing stick 20 or lath 22. Spike cylinders 40 are then actuated so that spikes 40a pierce spacing sticks 20 or the lath 22. Cylinder 70 is then actuated to retract shears 62 and 64. As indexing shears 62 and 64 retract back so as to be clear of the open ends of the magazines, the stack of spacing sticks 20 or lath 22 drop down on to the respective plates 62a and 64a ready for the next indexing cycle.

Cylinder 74 is again actuated to translate spike cylinder mount 36 downwardly, transporting the spacing stick 20 or lath 22 to the top surface 14a of lumber stack 14, at which point spike cylinders 40 are again actuated, so as to retract spikes 40a to strip spacing sticks 20 or lath 22 from spikes 40a. Spacing sticks 20 or lath 22 are thus left on top of the lumber stack 14, lumber stack 14 is then lowered incremently by the stacker hoist knees 18 to position the lumber stack 14 for another tier of lumber. The stick or lath placing cycle then repeats.

Figure 12:
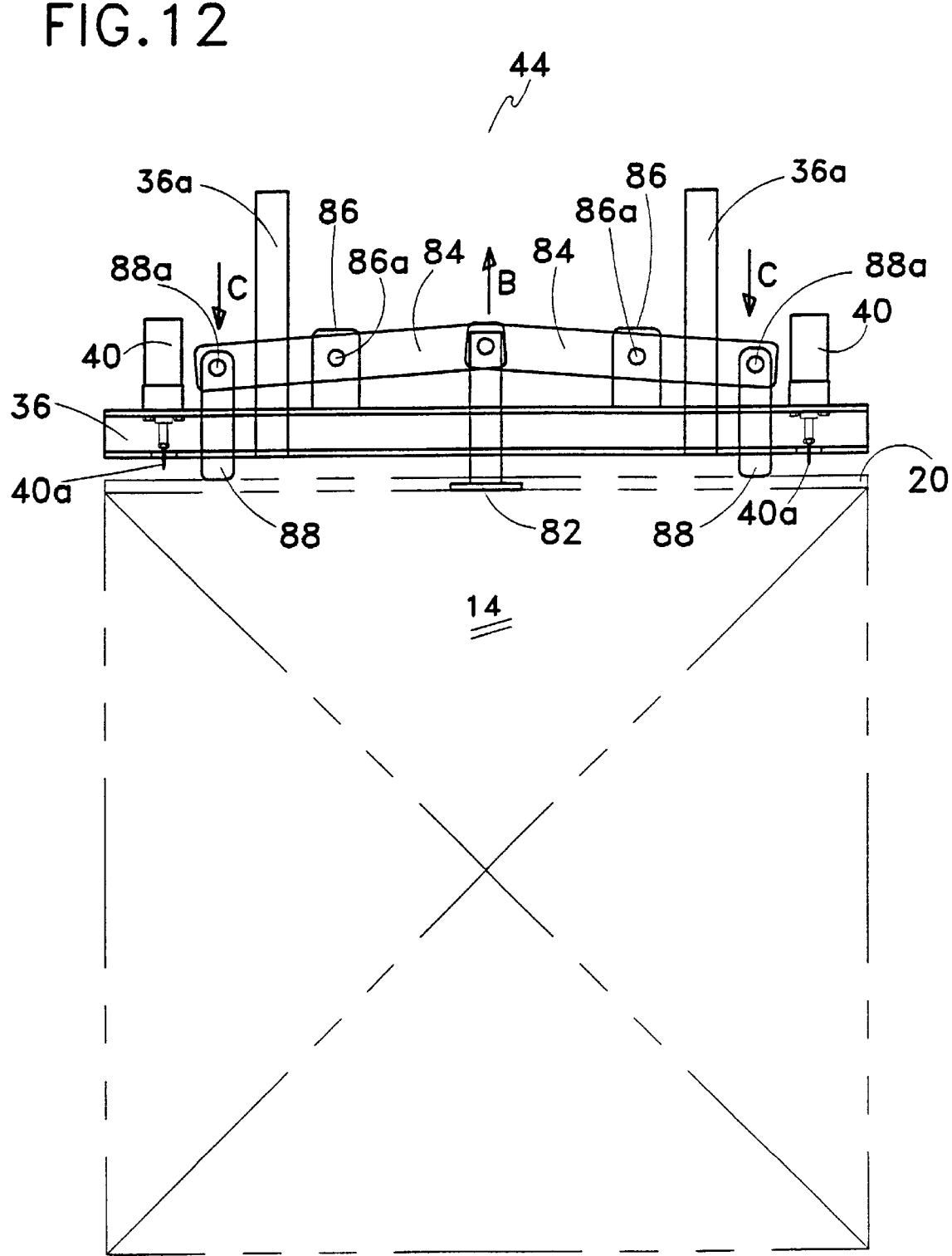
FIG. 12 is an end elevation view of the embodiment of FIG. 11 showing the stick stripping mechanism lowered and contacting the lumber stack.

An alternative means for placement of sticks 20 or lath 22 onto lumber stack 14 and for stripping sticks 20 or lath 24 from spikes 40a is illustrated in FIGS. 11 and 12. As spike cylinder mount 36 is lowered by extension cylinder 42 into proximity with the top surface 14a of lumber stack 14, foot 82 contacts the top surface driving foot 82 upwardly in direction B. Foot 82 is mounted to linkage members 84a by means of common pin 85. Linkage members 84a are pivotally mounted relative to spike cylinder mount 36 by means of pins 86a on fulcrum members 86. Fulcrum members 86 are rigidly mounted to spike cylinder mount 36. Stick stripping plungers 88 are mounted to the opposite ends of linkage members 84, as for example by means of pins 88a. Driving foot 82 in direction A drives stick stripping plungers 88 in direction C. This causes stick 20 (or lath 22) to be stripped from spikes 40a and accurately placed the last inch or so onto surface 14a. This arrangement is advantageous where, in some situations, it is difficult to maintain the top surface 14a at the exact desired height. This foot 82 strikes the top surface 14a and not the sticks 20 or lath 22 as sticks 20 or lath 22 are being held by spike 40a.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A device for placing spacing sticks or lath onto an upper surface of a lumber stack comprising:

(a) stick holding means for holding elongate spacing sticks or lath, (b) stick presentation means for receiving a spacing stick or lath from said holding means, and for presenting said spacing stick or lath into alignment beneath a selectively actuable stick spiking means, wherein said stick spiking means comprises at least one spike having a longitudinal driving axis, driving means for selectively driving said spike along said longitudinal driving axis between a retracted position and an extended position so as to penetrate, when in said extended position, said spike into releasable engagement with said spacing stick or lath when in said alignment, said spacing stick or lath positioned in said alignment when positioned adjacent and beneath said at least one spike when in said retracted position so as to intersect said longitudinal driving axis with said spacing stick or lath, (c) stick lowering means for lowering said stick spiking means, and for lowering said spacing stick or lath when releasably engaged with said stick spiking means, into proximity with said upper surface of said lumber stack, (d) stick stripping means for stripping said spacing stick or lath from said stick spiking means when said spike is retracted from said extended position into said retracted position so as to register said spacing stick or lath with said upper surface of said lumber stack.

2. The device of claim 1 wherein said spike is resiliently mounted to said driving means by a resilient mount.

3. The device of claim 2 wherein said resilient mount is a resilient collar mounted to said driving means and a base of said spike is snugly journalled in said collar.

4. The device of claim 1 wherein said stick holding means is a stick or lath pocket for holding in gravity fed abutment, a singulated array of parallel, adjacent, spacing sticks or lath and said stick presentation means is a rigid platform mounted at an open lower-most end of said pocket, said platform selectively positionable, by positioning means, between a stick supporting position adjacent and beneath said at least one spike when in said retracted position, wherein a stick or lath is supported on said platform when fed from said open lower-most end of said pocket, and a non-supporting position removed from beneath said at least one spike and removed from a travel path of said spike as said spike is driven from said retracted to said extended position.

5. The device of claim 4 wherein said platform is a pivotable shelf, and said positioning means is a resiliently biased hinge means for pivoting of said shelf from said stick supporting position to said non-supporting position against a return biasing force of said resiliently biased hinge means.

6. The device of claim 5 wherein said stick supporting position is a horizontal position and said non-supporting position is rotationally deflected about said hinge means so as to be lowered from said horizontal position out of said travel path of said spike.

7. The device of claim 6 wherein said shelf is deflected from said horizontal position by lowering of said spike and said stick spiking means by said stick lowering means.

8. The device of claim 4 wherein said platform is a selectively translatable shear and said positioning means is a shear translating means for selectively retractably translating said shear from beneath said open lower-most end of said pocket into said travel path of said spike so as to align said stick or lath with said longitudinal driving axis, and for retracting said shear once said spike has been driven so as to releasably penetrate said stick or lath.

9. The device of claim 1 wherein said stick lowering means is a parallelogram linkage of rigid members, said parallelogram linkage of rigid members pivotally mounted to a support frame, and selectively pivotable by selective actuation means so as to be selectively pivotable between an elevated position and a lowered position wherein said stick spiking means, mounted to said parallelogram linkage, is in proximity to said upper surface of said lumber stack.

10. The device of claim 9 wherein said parallelogram linkage in said lowered position lowers a first end of said stick or lath on said stick spiking means into said proximity to said upper surface of said lumber package sequentially first before lowering a second opposite end of said stick or lath.

11. A device for placing spacing sticks or lath onto an upper surface of a lumber stack comprising:

(a) stick holding means for holding, in gravity fed abutment, a singulated array of parallel, adjacent, elongate spacing sticks or lath, (b) stick presentation means for receiving a lower-most spacing stick or lath, gravity fed from said array of spacing sticks or lath held in said holding means, and for presenting said lower-most spacing stick or lath into alignment beneath a selectively actuable stick spiking means, wherein said stick spiking means comprises at least one spike having a longitudinal driving axis, driving means for selectively driving said spike along said longitudinal driving axis between a retracted position and an extended position so as to penetrate, when in said extended position, said spike into releasable engagement with said spacing stick or lath when in said alignment, said spacing stick or lath positioned in said alignment when positioned adjacent and beneath said at least one spike when in said retracted position so as to intersect said longitudinal driving axis with said spacing stick or lath, (c) stick lowering means for lowering said stick spiking means, and for lowering said spacing stick or lath when releasably engaged with said stick spiking means, into proximity with said upper surface of said lumber stack, (d) stick stripping means for stripping said spacing stick or lath from said stick spiking means when said spike is retracted from said extended position into said retracted position so as to register said spacing stick or lath with said upper surface of said lumber stack.

12. The device of claim 11 wherein said spike is resiliently mounted to said driving means by a resilient mount.

13. The device of claim 12 wherein said resilient mount is a resilient collar mounted to said driving means and a base of said spike is snugly journalled in said collar.

14. The device of claim 11 wherein said stick holding means is a stick or lath pocket and said stick presentation means is a rigid platform mounted at an open lower-most end of said pocket, said platform selectively positionable, by positioning means, between a stick supporting position adjacent and beneath said at least one spike when in said retracted position, wherein a stick or lath is supported on said platform when fed from said open lower-most end of said pocket, and a non-supporting position removed from beneath said at least one spike and removed from a travel path of said spike as said spike is driven from said retracted to said extended position.

15. The device of claim 14 wherein said platform is a pivotable shelf, and said positioning means is a resiliently biased hinge means for pivoting of said shelf from said stick supporting position to said non-supporting position against a return biasing force of said resiliently biased hinge means.

16. The device of claim 15 wherein said stick supporting position is a horizontal position and said non-supporting position is rotationally deflected about said hinge means so as to be lowered from said horizontal position out of said travel path of said spike.

17. The device of claim 16 wherein said shelf is deflected from said horizontal position by lowering of said spike and said stick spiking means by said stick lowering means.

18. The device of claim 14 wherein said platform is a selectively translatable shear and said positioning means is a shear translating means for selectively retractably translating said shear from beneath said open lower-most end of said pocket into said travel path of said spike so as to align said stick or lath with said longitudinal driving axis, and for retracting said shear once said spike has been driven so as to releasably penetrate said stick or lath.

19. The device of claim 11 wherein said stick lowering means is a parallelogram linkage of rigid members, said parallelogram linkage of rigid members pivotally mounted to a support frame, and selectively pivotable by selective actuation means so as to be selectively pivotable between an elevated position and a lowered position wherein said stick spiking means, mounted to said parallelogram linkage, is in proximity to said upper surface of said lumber stack.

20. The device of claim 19 wherein said parallelogram linkage in said lowered position lowers a first end of said stick or lath on said stick spiking means into said proximity to said upper surface of said lumber package sequentially first before lowering a second opposite end of said stick or lath.

* * * * *